US012160068B2

(12) United States Patent
Zhang et al.

(10) Patent No.: US 12,160,068 B2
(45) Date of Patent: Dec. 3, 2024

(54) CHARGING TERMINAL FOR CHARGING SOCKET, AND CHARGING SOCKET

(71) Applicants: TYCO ELECTRONICS (SUZHOU) LTD., Jiangsu Province (CN); TYCO ELECTRONICS (SHANGHAI) CO. LTD, Shanghai (CN); TYCO ELECTRONICS TECHNOLOGY (SIP) LTD., Jiangsu Province (CN)

(72) Inventors: Jianwen (Gerry) Zhang, Suzhou (CN); Weidong Zhang, Shanghai (CN); Haomai (Ivan) Yin, Shanghai (CN); Fangyue (Jason) Zhu, Shanghai (CN); Renyi (Ronny) Dou, Suzhou (CN)

(73) Assignees: TYCO ELECTRONICS (SUZHOU) LTD., Jiangsu Province (CN); TYCO ELECTRONICS (SHANGHAI) CO. LTD LTD, Shanghai (CN); TYCO ELECTRONICS TECHNOLOGY (SIP) LTD, Jiangsu Province (CN)

( * ) Notice: Subject to any disclaimer, the term of this patent is extended or adjusted under 35 U.S.C. 154(b) by 377 days.

(21) Appl. No.: 17/576,017

(22) Filed: Jan. 14, 2022

(65) Prior Publication Data

US 2022/0231453 A1 Jul. 21, 2022

(30) Foreign Application Priority Data

Jan. 20, 2021 (CN) ........................ 202120157416.X

(51) Int. Cl.
*H01R 13/74* (2006.01)
*H01R 4/28* (2006.01)
(Continued)

(52) U.S. Cl.
CPC ............. *H01R 13/629* (2013.01); *H01R 4/28* (2013.01); *H01R 13/11* (2013.01); *H01R 13/502* (2013.01); *H01R 13/5202* (2013.01)

(58) Field of Classification Search
CPC ........ H01R 13/629; H01R 4/28; H01R 13/11; H01R 13/502; H01R 13/5202;
(Continued)

(56) References Cited

U.S. PATENT DOCUMENTS

2015/0147918 A1* 5/2015 Matsuda ................ B60L 50/50 439/694
2015/0258905 A1* 9/2015 Fukushima ............ H01R 13/74 439/34
(Continued)

*Primary Examiner* — Abdullah A Riyami
*Assistant Examiner* — Nelson R. Burgos-Guntin
(74) *Attorney, Agent, or Firm* — Potomac Law Group, PLLC

(57) ABSTRACT

The present application provides a charging terminal applied in a charging socket and provides a charging socket, the charging terminal includes a main body, a first engagement part and a second engagement part; the first engagement part is configured to pluggably connect with a first mating terminal; and the second engagement part is configured to engage with a second mating terminal of an external charging device. In the charging terminal and the charging socket provided by the present application, when the charging terminal needs to be repaired due to damage, the first engagement part of the charging terminal may be detached from the first mating terminal to complete disassembly, and a first engagement part of an undamaged charging terminal is engaged and fixed in the first mating terminal, the process of which is simple in term of maintenance and reduces the maintenance cost.

14 Claims, 4 Drawing Sheets

(51) Int. Cl.

| | |
|---|---|
| ***H01R 13/11*** | (2006.01) |
| ***H01R 13/502*** | (2006.01) |
| ***H01R 13/52*** | (2006.01) |
| ***H01R 13/629*** | (2006.01) |

(58) Field of Classification Search

CPC .. H01R 2101/00; H01R 13/04; H01R 13/521; H01R 13/111; H01R 13/02; H01R 13/10; H01R 13/2407; H01R 13/66; B60L 53/16; B60L 53/31; B60Y 2200/91; Y02T 90/14

See application file for complete search history.

(56) References Cited

U.S. PATENT DOCUMENTS

2016/0006156 A1* 1/2016 Shimizu ................. H01R 13/04 439/310
2016/0104967 A1* 4/2016 Schmidt ............. H01R 13/5202 439/587
2018/0043848 A1* 2/2018 Kawai .................. H01R 13/447
2019/0135131 A1* 5/2019 Wenz ..................... H01R 4/308
2019/0267758 A1* 8/2019 Jung ........................ B60L 50/60
2020/0244016 A1* 7/2020 Karasawa ............ H01R 13/748
2020/0384875 A1* 12/2020 Rhodes ................... B60L 53/11

* cited by examiner

CHARGING TERMINAL FOR CHARGING SOCKET, AND CHARGING SOCKET

TECHNICAL FIELD

The present application involves in the field of charger technologies, and more particularly relates to a charging terminal applied in a charging socket, and a charging socket.

BACKGROUND OF INVENTION

With increasing pressure on worldwide energy and environment, the concept of energy saving, and environmental protection has been penetrated into various fields. For the automotive industry, compared with traditional fuel engine vehicles and gas engine vehicles, electric vehicles using a power battery as a power source have gradually entered a wide range of practical stages due to their characteristics of cleanness and environmental protection. With gradual increase in the number of the electric vehicles, it is necessary to charge the battery frequently during the use of the electric vehicle, and a structure of a charging terminal of a charging socket in the vehicle has significant influence in application performance and service life of the charging socket. In the charging socket, the charging terminal is usually designed as a pluggable structure, and the charging terminal is subject to damage during multiple usage of the charging socket. In the prior art, one end of the charging terminal of the charging socket is a female end electrically connected with an external power source, and the other end is riveted with a cable, and the whole charging socket needs to be disconnected when the charging terminal needs to be repaired due to damage, therefore it is more difficult to maintain, and the maintenance cost is relatively high.

SUMMARY OF INVENTION

A purpose of the present application is to provide a charging terminal applied in a charging socket, and a charging socket, so as to solve the technical problems existed in the prior art that it is of high difficulty to maintain and the maintenance cost is relatively high when the charging terminal of the charging socket needs to be repaired due to damage.

In order to achieve the above purpose, a technical solution adopted by the present application is to provide a charging terminal applied in a charging socket. The charging terminal can have a main body, a first engagement part and a second engagement part. The first engagement part is configured to pluggably connect with a first mating terminal. The second engagement part is configured to engage with a second mating terminal of an external charging device.

In an embodiment, one end of the first engagement part is fixedly connected to the second engagement part, and another end of the first engagement part is a flat conductive sheet configured to pluggably connect with the first mating terminal.

In an embodiment, the first engagement part is provided with a guide structure disposed at a peripheral side wall of the conductive sheet.

In an embodiment, outer surfaces on both sides of the conductive sheet are electrical contact surfaces.

In an embodiment, the outer surfaces of the conductive sheet are provided with an anti-skid structure.

In an embodiment, the second engagement part is tubular, the second engagement part is provided with an upper end fixedly connected to the first engagement part and a bottom end opposite to the upper end, and a circumferential inner wall of the bottom end of the second engagement part is enclosed to form a tubular cavity configured to axially and plugably connect with the second mating terminal.

In an embodiment, the width of the first engagement part is smaller than a tubular outer diameter of the second engagement part.

In an embodiment, a sealing member is provided on the charging terminal, and the sealing member includes a sealing ring surroundedly arranged on an outer surface of the second engagement part and a sealing plug arranged inside the tubular cavity.

In an embodiment, the charging terminal is an integral piece formed by a sheet having uniform thickness.

In an embodiment, the first engagement part includes a conversion part and a conductive sheet, the conversion part is connected between the main body and the conductive sheet, and the thickness of the conductive sheet is twice the thickness of the sheet.

In an embodiment, the conductive sheet is formed by partly stacking the same two of the sheets.

In an embodiment, the first engagement part includes two of the conversion parts partly connected to the two of the sheets respectively.

In an embodiment, the charging terminal is an AC charging terminal.

The present application further provides a charging socket, which includes a socket housing provided with a terminal cavity and the above-mentioned charging terminal applied in the charging socket and arranged in the socket housing.

In an embodiment, a clamping resilient sheet is provided on a circumferential outer wall of the charging terminal, and an inner wall of the socket housing is provided with a clamping portion adapted to the clamping resilient sheet.

Beneficial effects of the charging terminal applied in the charging socket and provided by the present application lie in that: compared with the prior art, the charging terminal in the present application includes the main body, the first engagement part and the second engagement part; the first engagement part is configured to pluggably connect with the first mating terminal, the first mating terminal clamps the first engagement part for fixation, the second engagement part is configured to engage with the second mating terminal of the external charging device, the charging terminal is electrically connected with the external charging device via the second engagement part, and the first engagement part transmits electric energy to the first mating terminal engaged thereto and thus the electric energy is transmitted to the storage battery; when the charging terminal needs to be repaired due to damage, the first engagement part of the charging terminal is detached from the first mating terminal to complete disassembly; and a first engagement part of an undamaged charging terminal is engaged and fixed in the first mating terminal, the process of which is simple in term of maintenance and reduces the maintenance cost.

Beneficial effects of the charging socket provided by the present application lie in that: compared with the prior art, the charging socket in the present application includes the socket housing provided with the terminal cavity and the above-mentioned charging terminal applied in the charging socket and arranged in the socket housing; the charging terminal includes the main body, the first engagement part and the second engagement part; the first engagement part is configured to pluggably connect with the first mating terminal, the first mating terminal clamps the first engagement part for fixation, the second engagement part is configured to engage with the second mating terminal of the external charging device, the charging socket is electrically connected with the external charging device via the second engagement part arranged in the socket housing, and the first engagement part transmits electric energy to the first mating terminal engaged thereto and thus the electric energy is transmitted to the storage battery connected with the charging socket; when the charging terminal of the charging socket needs to be repaired due to damage, the first engagement part of the charging terminal is detached from the first mating terminal and is removed from the socket housing to complete disassembly; and an undamaged charging terminal is mounted to the socket housing, and a first engagement part is engaged and fixed in the first mating terminal, the process of which is simple in term of maintenance and reduces the maintenance cost.

DESCRIPTION OF THE DRAWINGS

In order to illustrate the technical solutions in the embodiments of the present application more clearly, the drawings needed to be used in the description of the embodiments or the prior art will be briefly introduced below. Obviously, the drawings in the following description are only some embodiments of the present application, and other drawings may also be obtained by those of ordinary skill in the art based on these drawings without creative labor.

Figure 1:
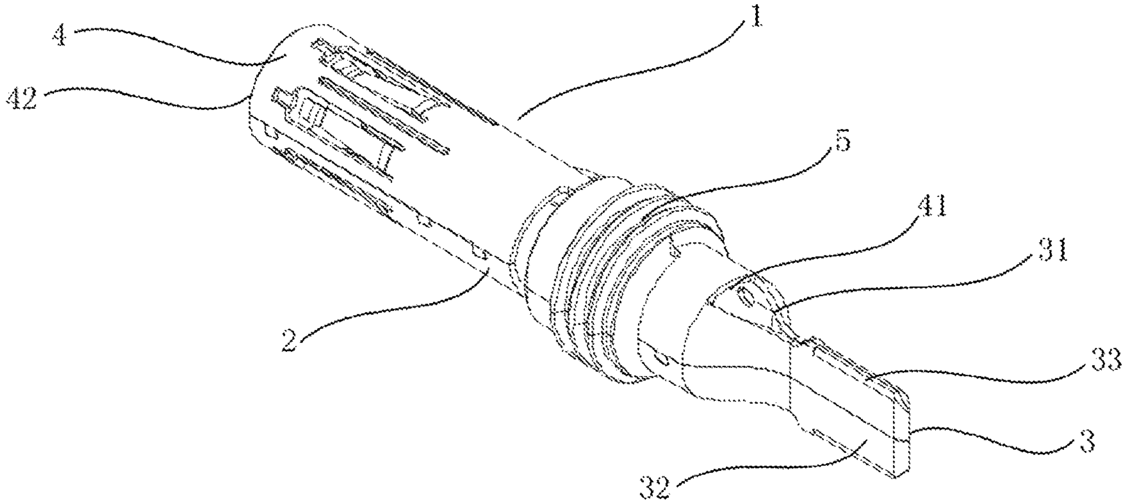
FIG. 1 is a first stereoscopic structure diagram of the charging terminal provided by an embodiment of the present application.

Among them, reference signs in the drawings are as follows:

1—charging terminal; 11—clamping resilient sheet; 2—main body; 3—first engagement part; 31—conversion part; 32—conductive sheet; 33—guide structure; 4—second engagement part; 41—upper end; 42—bottom end; 421—tubular cavity; 5—sealing member; 51—sealing ring; 52—sealing plug.

DETAILED DESCRIPTION OF EMBODIMENTS

In order to make the technical problems to be solved, technical solutions and beneficial effects of the present application more comprehensible, the present application is described in detail below with reference to the accompanying drawings and embodiments. It should be understood that the specific embodiments described herein are only used to explain the present application and are not used to limit the present application.

It should be noted that, when an element is referred to as being "fixed to" or "arranged on" another element, this element may be directly on the another element or indirectly on the another element; when an element is referred to as being "connected to" another element, this element may be directly connected to the another element or indirectly connected to the another element.

It should be understood that, orientations or positional relationships indicated by terms such as "length", "width", "upper", "lower", "front", "rear", "left", "right", "vertical", "horizontal", "top", "bottom", "inner", "outer", etc. are based on orientations or positional relationships as shown in the drawings, which are only aimed to facilitate description of the present application and simplification of the description, rather than to indicate or imply that an indicated device or element must have a specific orientation or be constructed and operated in a specific orientation. Therefore, the orientations or positional relationships cannot be understood as a limitation of the present application.

Additionally, the terms "first" and "second" are only used for a descriptive purpose and cannot be understood as an indication or implication of relative importance or an implicit indication of the number of an indicated technical feature. Thus, a feature defined with "first" and "second" may explicitly or implicitly include one or more of the features. In the description of the present application, the phrase "a plurality of" means two or more than two, unless otherwise explicitly and specifically defined.

Figure 2:
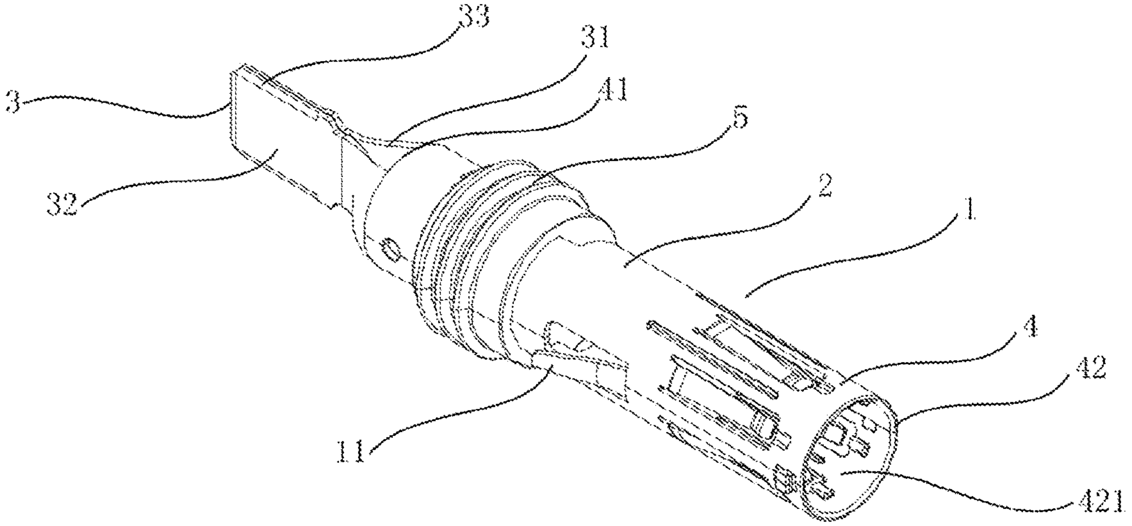
FIG. 2 is a second stereoscopic structure diagram of the charging terminal provided by an embodiment of the present application.
Figure 3:
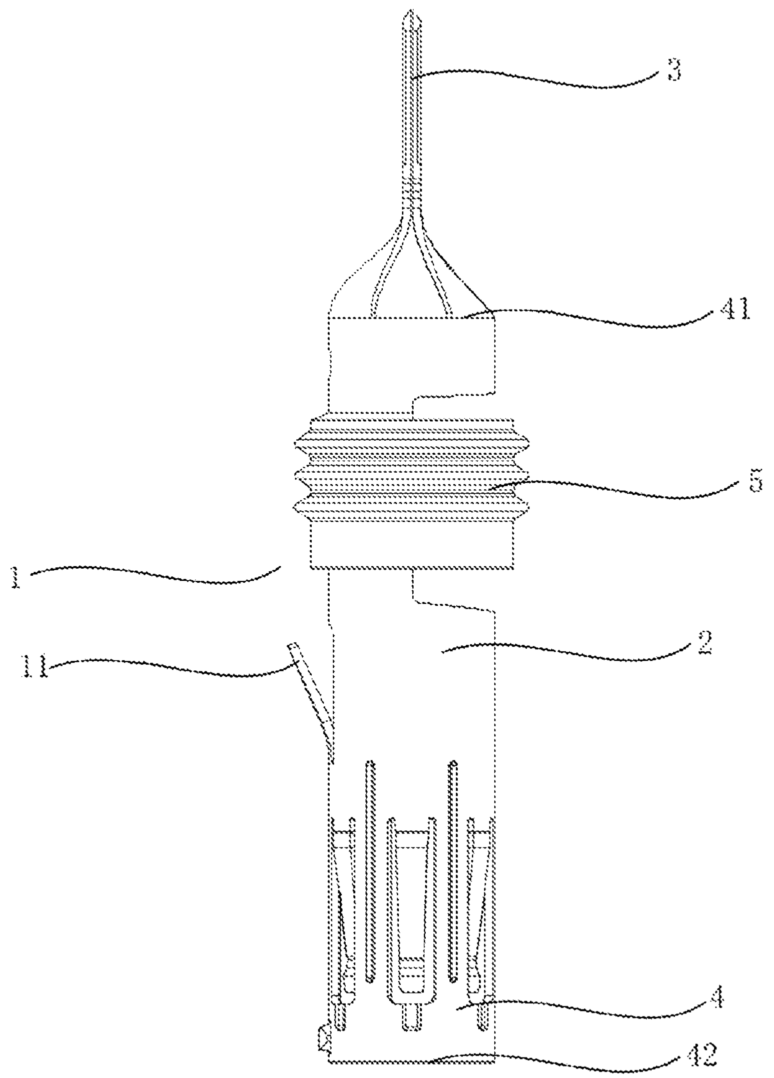
FIG. 3 is a front structure diagram of the charging terminal provided by an embodiment of the present application.

Please refer to FIGS. 1 to 3 together, a charging terminal 1 applied in a charging socket and provided by this embodiment includes a main body 2, a first engagement part 3 and a second engagement part 4. The first engagement part 3 is configured to pluggably connect with a first mating terminal, the first mating terminal clamps the first engagement part 3 for fixation, and the second engagement part 4 is configured to engage with a second mating terminal of an external charging device. Through electrically connecting the second engagement part 4 with the external charging device, the first engagement part 3 transmits electric energy to the first mating terminal engaged thereto and thus the electric energy is transmitted to a storage battery. When the charging terminal 1 needs to be repaired due to damage, the first engagement part 3 of the charging terminal 1 is detached from the first mating terminal to complete disassembly, and a first engagement part 3 of an undamaged charging terminal 1 is engaged and fixed in the first mating terminal, the process of which is simple in term of maintenance and reduces maintenance cost. Optionally, the charging terminal 1 is an AC charging terminal.

Figure 4:
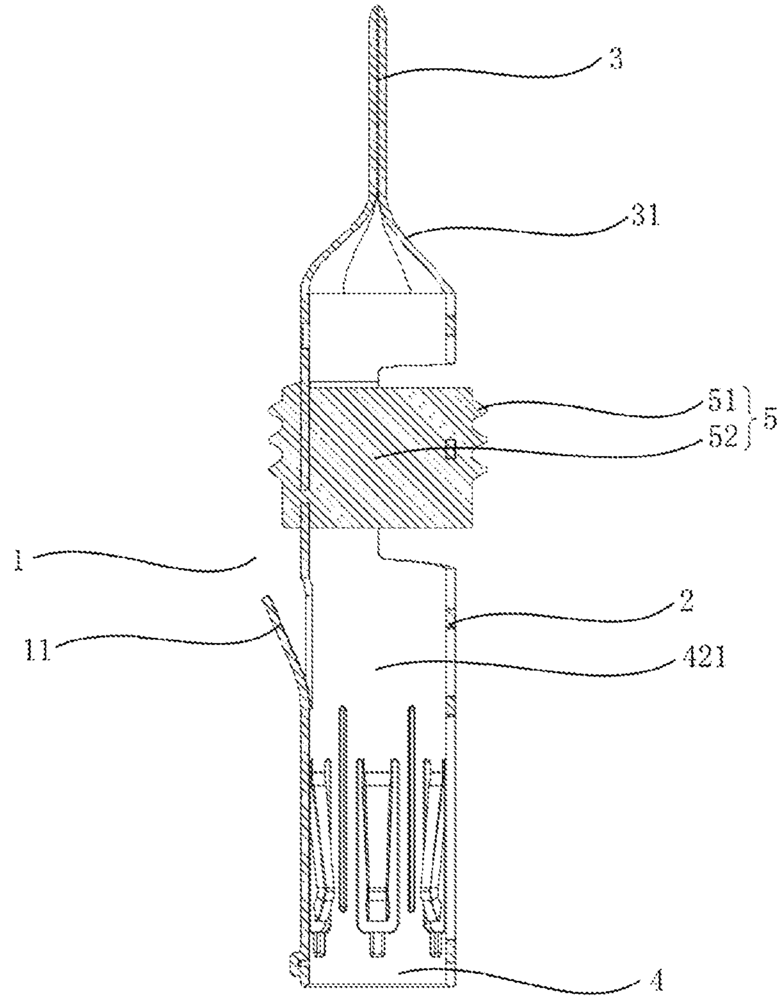
FIG. 4 is a cross-sectional structure diagram of the charging terminal provided by an embodiment of the present application.

Please refer to FIGS. 2 to 4 together, as a specific implementation of the charging terminal 1 provided in this embodiment, one end of the first engagement part 3 of the charging terminal 1 is fixedly connected to the second engagement part 4, and the other end of the first engagement part 3 is a flat conductive sheet 32 configured to pluggably connect with the first mating terminal. Through arranging one end of the first engagement part 3 as a flat conductive sheet 32, it is more convenient for the first engagement part 3 and the first mating terminal to be pluggably connected. When the charging terminal 1 is damaged and needs to be repaired, the conductive sheet 32 of the first engagement part 3 may be detached from the first mating terminal to complete the disassembly, and a conductive sheet 32 of an undamaged first engagement part 3 is engaged and fixed to the first mating terminal, which is easy to maintain and reduces the maintenance cost. Optionally, outer surfaces on both sides of the conductive sheet 32 are all electrical contact surfaces, so that the first mating terminal can realize current transmission while being plyggably connected with the first engagement part 3, the second engagement part 4 is electrically connected to the external charging device, and the first engagement part 3 transmits the electric energy to the first mating terminal pluggably connected thereto and to the storage battery. Optionally, the outer surfaces of the conductive sheet 32 are provided with an anti-skid structure, which is beneficial to increase the friction force between the conductive sheet 32 and the first mating terminal, and facilitates the connection stability between the first mating terminal and the charging terminal 1. Optionally, the first engagement part 3 is provided with a guide structure 33 disposed at a peripheral side wall of the conductive sheet 32 to limit a movement direction of the first engagement part 3, so as to facilitate the pluggable connection between the charging terminal 1 and the first mating terminal. The specific structure of the guide structure 33 is not limited herein. Optionally, the guide structure 33 is a guide chamfer provided on the circumferential side wall of the conductive sheet 32.

Please refer to FIGS. 2 to 4 together, in this embodiment, the second engagement part 4 of the charging terminal 1 is tubular, and the second engagement part 4 is provided with an upper end 41 fixedly connected to the first engagement part 3 and a bottom end 42 opposite to the upper end 41. A circumferential inner wall of the bottom end 42 of the second engagement part 4 is enclosed to form a tubular cavity 421 configured to axially and plugably connect with the second mating terminal, and the second mating terminal may be inserted into the tubular cavity 421 along the axial direction of the second engagement part 4 via the bottom end 42 of the second engagement part 4. Optionally, the circumferential inner wall of the second engagement part 4 is evenly provided with a plurality of metal elastic pieces configured to abut and clamp the second mating terminal, such that the pluggable connection between the second mating terminal and the second engagement part 4 is more stable, which is beneficial to improve the reliability of the charging terminal 1. Optionally, the width of the first engagement part 3 is smaller than a tubular outer diameter of the second engagement part 4, which is convenient for assembly and disassembly.

Please further refer to FIGS. 3 to 4, in this embodiment, a sealing member 5 is provided on the charging terminal 1, and the specific structure and material of the sealing member 5 are not limited herein. Optionally, the sealing member 5 has a sealing ring 51 surroundedly arranged on an outer surface of the second engagement part 4 and a sealing plug 52 arranged inside the tubular cavity 421, and the sealing plug 52 divides the tubular cavity 421 into tubular cavities 421 at two ends which are axially sealed to each other. Optionally, the sealing member 5 and the main body 2 are overmolded as an integral part.

Figure 5:
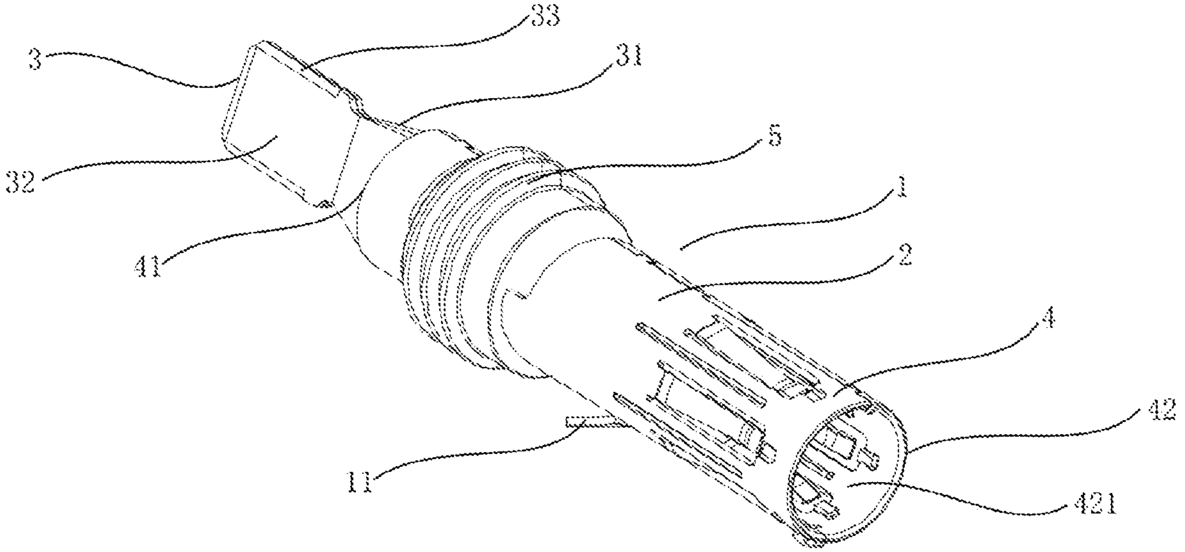
FIG. 5 is a stereoscopic structure diagram of the charging terminal provided by another embodiment of the present application.

Please refer to FIG. 5, as another specific implementation of the charging terminal 1 provided by the present application, the charging terminal 1 is an integral piece formed by a sheet having uniform thickness. Optionally, the first engagement part 3 includes a conversion part 31 and a conductive sheet 32, the conversion part 31 is connected between the main body 2 and the conductive sheet 32, the thickness of the conductive sheet 32 is twice the thickness of the sheet, the first engagement part 3 is formed by extruding the sheet, and the thickness of the conductive sheet 32 is twice the thickness of the sheet, which is beneficial to improve the reliability of the conductive sheet 32 and facilitates processing and production. Optionally, the conductive sheet 32 is formed by partly stacking the same two of the sheets, which is convenient for mass production. Optionally, the first engagement part 3 includes two of the conversion parts 31, which are partly connected to the two of the sheets respectively to ensure the connection stability between the conductive sheet 32 and the main body 2 as well as the reliability of the product.

The present application further provides a charging socket, which includes a socket housing provided with a terminal cavity and the above-mentioned charging terminal 1 applied in the charging socket and arranged in the socket housing; the charging terminal 1 includes the main body 2, the first engagement part 3 and the second engagement part 4; the first engagement part 3 is configured to pluggably connect with the first mating terminal, the first mating terminal clamps the first engagement part 3 for fixation, the second engagement part 4 is configured to engage with the second mating terminal of the external charging device, the charging socket is electrically connected with the external charging device via the second engagement part 4 arranged in the socket housing, and the first engagement part 3 transmits electric energy to the first mating terminal engaged thereto and thus the electric energy is transmitted to the storage battery connected to the charging socket; when the charging terminal 1 of the charging socket needs to be repaired due to damage, the first engagement part 3 of the charging terminal 1 is detached from the first mating terminal and is removed from the socket housing to complete disassembly; and an undamaged charging terminal 1 is mounted in the socket housing, and the first engagement part 3 is engaged and fixed in the first mating terminal, the process of which is simple in term of maintenance and reduces the maintenance cost. Optionally, a clamping resilient sheet 11 is provided on a circumferential outer wall of the charging terminal 1, and an inner wall of the socket housing is provided with a clamping portion adapted to the clamping resilient sheet 11, and the charging terminal 1 is firmly mounted in a way of clamping in the socket housing, so that the resistance subjected during the assembly process is smaller. The clamping resilient sheet 11 shrinks after being squeezed so as to reduce the resistance, which is convenient for an operator to assemble. The number of the clamping resilient sheet 11 is not limited herein. Optionally, there are a plurality of clamping resilient sheets 11, and the plurality of clamping resilient sheet 11 are arranged on the circumferential outer wall of the charging terminal 1 at intervals, which is beneficial to improve the connection stability between the charging terminal 1 and the socket housing.

Only preferred embodiments of this embodiment are described in the above description, which are not intended to limit this embodiment. Any modification, equivalent replacement and improvement made within the spirit and principle of this embodiment shall be included within the protection scope of this embodiment.

What is claimed is:

1. A charging terminal for use in a charging socket, the charging terminal comprising a main body, a first engagement part and a second engagement part;

wherein the first engagement part is configured to pluggably connect with a first mating terminal;

wherein the second engagement part is configured to engage with a second mating terminal of an external charging device; and wherein one end of the first engagement part is fixedly connected to the second engagement part, and another end of the first engagement part is a flat conductive sheet configured to pluggably connect with the first mating terminal.

2. The charging terminal of claim 1, wherein the first engagement part is provided with a guide structure disposed at a peripheral side wall of the conductive sheet.

3. The charging terminal of claim 1, wherein outer surfaces on both sides of the conductive sheet are electrical contact surfaces.

4. The charging terminal of claim 2, wherein the outer surfaces of the conductive sheet are provided with an anti-skid structure.

5. The charging terminal of claim 1, wherein the second engagement part is tubular, the second engagement part is provided with an upper end fixedly connected to the first engagement part and a bottom end opposite to the upper end, and a circumferential inner wall of the bottom end of the second engagement part is enclosed to form a tubular cavity configured to axially and pluggably connect with the second mating terminal.

6. The charging terminal of claim 5, wherein the width of the first engagement part is smaller than a tubular outer diameter of the second engagement part.

7. The charging terminal of claim 5, wherein a sealing member is provided on the charging terminal, and the sealing member comprises a sealing ring surroundedly arranged on an outer surface of the second engagement part and a sealing plug arranged inside the tubular cavity.

8. The charging terminal of claim 1, wherein the charging terminal is an integral piece formed by a sheet having uniform thickness.

9. The charging terminal of claim 8, wherein the first engagement part comprises a conversion part and a conductive sheet, the conversion part is connected between the main body and the conductive sheet, and the thickness of the conductive sheet is twice the thickness of the sheet.

10. The charging terminal of claim 9, wherein the conductive sheet is formed by partly stacking the same two of the sheets.

11. The charging terminal of claim 10, wherein the first engagement part comprises two of the conversion parts partly connected to the two of the sheets respectively.

12. The charging terminal of claim 1, wherein the charging terminal is an AC charging terminal.

13. A charging socket, comprising:

a socket housing formed with a terminal cavity; and a charging terminal arranged in the socket housing and comprising a main body, a first engagement part and a second engagement part;

wherein the first engagement part is configured to pluggably connect with a first mating terminal;

wherein the second engagement part is configured to engage with a second mating terminal of an external charging device; and wherein one end of the first engagement part is fixedly connected to the second engagement part, and another end of the first engagement part is a flat conductive sheet configured to pluggably connect with the first mating terminal.

14. The charging socket of claim 13, wherein a clamping resilient sheet is provided on a circumferential outer wall of the charging terminal, and an inner wall of the socket housing is provided with a clamping portion adapted to the clamping resilient sheet.

* * * * *